United States Patent
Kajiyama

(10) Patent No.: US 11,382,283 B2
(45) Date of Patent: Jul. 12, 2022

(54) PLANT CULTIVATION METHOD AND PLANT CULTIVATION DEVICE

(71) Applicant: AGC GREEN-TECH CO., LTD., Chiyoda-ku (JP)

(72) Inventor: Hiroshi Kajiyama, Kagawa (JP)

(73) Assignee: AGC GREEN-TECH CO., LTD., Chiyoda-ku (JP)

( * ) Notice: Subject to any disclaimer, the term of this patent is extended or adjusted under 35 U.S.C. 154(b) by 121 days.

(21) Appl. No.: 16/784,556

(22) Filed: Feb. 7, 2020

(65) Prior Publication Data
US 2020/0170197 A1    Jun. 4, 2020

Related U.S. Application Data

(63) Continuation of application No. PCT/JP2018/029818, filed on Aug. 8, 2018.

(30) Foreign Application Priority Data

Aug. 8, 2017  (JP) ............................ JP2017-153544

(51) Int. Cl.
*A01G 9/24* (2006.01)
*A01G 7/04* (2006.01)
(Continued)

(52) U.S. Cl.
CPC .............. *A01G 9/249* (2019.05); *A01G 7/045* (2013.01); *A01G 9/1438* (2013.01); *A01G 7/02* (2013.01); *A01G 9/18* (2013.01)

(58) Field of Classification Search
CPC .......... A01G 9/249; A01G 7/045; A01G 7/02; A01G 9/18
See application file for complete search history.

(56) References Cited

U.S. PATENT DOCUMENTS

| | | | |
|---|---|---|---|
| 2014/0165462 A1 | 6/2014 | Shigyo et al. | |
| 2014/0170733 A1 | 6/2014 | Shigyo et al. | |
| 2014/0250778 A1* | 9/2014 | Suntych | C12M 35/02 47/1.4 |

FOREIGN PATENT DOCUMENTS

| | | | | |
|---|---|---|---|---|
| EP | 0004450 B1 * | 7/1982 | ............ | A01G 9/246 |
| RU | 2530488 C2 * | 10/2014 | ............ | A01G 9/249 |
| WO | WO2013/021952 A1 | 2/2013 | | |

OTHER PUBLICATIONS

Machine translation of RU-2530488-C2 (Year: 2021).*

(Continued)

*Primary Examiner* — Monica L Barlow
*Assistant Examiner* — Madeline L Douglas
(74) *Attorney, Agent, or Firm* — Oblon, McClelland, Maier & Neustadt, L.L.P.

(57) ABSTRACT

A plant cultivation method includes providing a growth period and a rest period alternately. In the rest period, a dark period and a bright period is alternately provided. In the dark period, an intensity of light applied to a cultivation target plant is lower than a light intensity at a light compensation point. In the bright period, blue light whose wavelength is 400 nm to 500 nm is applied at an intensity that is lower than the light intensity at the light compensation point. A one-cycle time T of repetition of the dark period and the bright period is 2 μs to 500 μs. A duty ratio ΔT/T of a bright period time ΔT to the one-cycle time T is 20% or smaller. The blue light has a photosynthetic photon flux density of 0.001 $\mu mol \cdot m^{-2} \cdot s^{-1}$ to 4.0 $\mu mol \cdot m^{-2} \cdot s^{-1}$.

10 Claims, 8 Drawing Sheets

(51) Int. Cl.
*A01G 9/14* (2006.01)
*A01G 7/02* (2006.01)
*A01G 9/18* (2006.01)

(56) References Cited

OTHER PUBLICATIONS

Machine translation of WO-2013021952-A1 (Year: 2021).*
International Search Report dated Oct. 30, 2018 in PCT/JP2018/029818 filed Aug. 8, 2018, 2 pages.

* cited by examiner

PLANT CULTIVATION METHOD AND PLANT CULTIVATION DEVICE

TECHNICAL FIELD

The present invention relates to a plant cultivation method and a plant cultivation apparatus for accelerating the growth of plants.

BACKGROUND ART

In outdoor cultivation and greenhouse cultivation of plants, there may occur, depending on the season or weather, a case that optical energy necessary for photosynthesis cannot be obtained fully and the growth speed of the plants is lowered. On the other hand, in cultivation in plant cultivation factories that use artificial light, although the optical energy can be close to an optimum value, the cost for introduction of light source and the running cost are large and it is pointed out that there exist profitability-related problems. Thus, it is desired to develop a light source and light irradiation method capable of accelerating the growth speed of plants in outdoor cultivation and greenhouse cultivation of plants, and cultivation in plant cultivation factories.

Patent Literature 1 discloses, as a plant cultivation method using an artificial light source, a technique for increasing the growth speed of plants by irradiating them with blue LED light and red LED light alternately. Patent literature 1 describes that the growth of plants is accelerated by executing, repeatedly and alternately in a prescribed period, a step of irradiating the plants with red LED light and a step of irradiating the plants with blue LED light. It is reported that this method makes the growth speed of plants higher than the case where red LED light and blue LED light are applied simultaneously.

CITATION LIST

Patent Literature

Patent Literature 1: WO 2013/021952 A1

SUMMARY OF INVENTION

Technical Problem

However, the method disclosed in Patent Literature 1 is associated with problems that physiological disorders are prone to occur in leaves, plants are prone to wither after harvest, the alternate irradiation with high-intensity red light and blue light imposes a heavy psychological load on workers, and the running cost is large because of irradiation with high-intensity light.

An object of the present invention is to provide a plant cultivation method and plant cultivation apparatus that are less prone to cause physiological disorders in leaves and withering of plants after harvest and can reduce the psychological load on workers and running cost and can accelerate the growth of plants.

Solution to Problem

The present invention provides the following plant cultivation method and plant cultivation apparatus.

(1) A plant cultivation method, comprising: providing, alternately, a growth period in which an amount of carbon dioxide absorbed by photosynthesis is larger than an amount of carbon dioxide emitted by respiration and a rest period in which an amount of carbon dioxide emitted by respiration is larger than an amount of carbon dioxide absorbed by photosynthesis; and growing a plant, wherein:

in the rest period, a dark period in which an intensity of light applied to the cultivation target plant is lower than a light intensity at a light compensation point and a bright period in which blue light whose wavelength is 400 nm or greater and 500 nm or shorter is applied at an intensity that is lower than the light intensity at the light compensation point are provided alternately;

a one-cycle time T of repetition of the dark period and the bright period is 2 µs or longer and 500 µs or shorter;

a duty ratio $\Delta T/T$ of a time $\Delta T$ of the bright period to the one-cycle time T is 20% or smaller; and the blue light has a photosynthetic photon flux density of 0.001 $\mu mol \cdot m^{-2} \cdot s^{-1}$ or higher and 4.0 $\mu mol \cdot m^{-2} \cdot s^{-1}$ or lower.

(2) A plant cultivation method, comprising providing, alternately, a dark period in which an intensity of light applied to a cultivation target plant is lower than a light intensity at a light compensation point and a bright period in which blue light whose wavelength is 400 nm or greater and 500 nm or shorter is applied, during nighttime, wherein:

a one-cycle time T of repetition of the dark period and the bright period is 2 µs or longer and 500 µs or shorter;

a duty ratio $\Delta T/T$ of a time $\Delta T$ of the bright period to the one-cycle time T is 20% or smaller; and the blue light has a photosynthetic photon flux density of 0.001 $\mu mol \cdot m^{-2} \cdot s^{-1}$ or higher and 4.0 $\mu mol \cdot m^{-2} \cdot s^{-1}$ or lower.

(3) The plant cultivation method according to (1) or (2), wherein the photosynthetic photon flux density of the blue light is 1.0 $\mu mol \cdot m^{-2} \cdot s^{-1}$ or lower.

(4) The plant cultivation method according to (1) or (2), wherein in the dark period, the plant is not irradiated with red light whose wavelength is 600 nm or greater and 700 nm or shorter.

(5) The plant cultivation method according to any one of (1) to (4), wherein the blue light is light emitted from an LED light source.

(6) The plant cultivation method according to (1), wherein light that is applied to the plant in the growth period is sunlight or continuous irradiation light emitted from an artificial light source.

(7) The plant cultivation method according to (6), wherein the artificial light source is an LED light source or a fluorescent lamp.

(8) The plant cultivation method according to any one of (1) to (7), comprising providing a non-irradiation period in which the plant is not irradiated with light.

(9) A plant cultivation apparatus comprising:
a light irradiation unit configured to irradiate a plant with light; and
an irradiation light control unit configured to drive lighting of the light irradiation unit based on the plant cultivation method according to any one of (1) to (8).

(10) The plant cultivation apparatus according to (9), further comprising a protective member through which light is transmitted and which covers a cultivation floor of the plant.

(11) A plant cultivation apparatus comprising:
a cultivation floor in which a plant is planted;
a light irradiation unit configured to emit light toward the cultivation floor;
an irradiation light control unit configured to drive lighting of the light irradiation unit based on the plant cultivation method according to any one of (1) to (8); and a film for greenhouse cultivation through which sunlight is transmitted and which covers the cultivation floor to form a cultivation space.

(12) The plant cultivation apparatus according to (11), wherein the film comprises at least one selected from the group consisting of fluororesins, polyethylene, polypropylene, polyester, polyvinyl chloride, polyamide, and polycarbonate.

(13) The plant cultivation apparatus according to (12), wherein the fluororesin is at least one selected from the group consisting of polyvinylidene fluoride, polytetrafluoroethylene, polychlorotrifluoroethylene, polyhexafluoropropylene, polyvinyl fluoride, vinylidene fluoride-tetrafluoroethylene-hexafluoropropylene-based copolymers, vinylidene fluoride-hexafluoropropylene-based copolymers, ethylene-tetrafluoroethylene-based copolymers, tetrafluoroethylene-hexafluoropropylene-based copolymers, and perfluoro(alkylvinyl ether)-tetrafluoroethylene-based copolymers.

(14) A plant cultivation apparatus comprising:
a cultivation floor in which a plant is planted;
a light irradiation unit configured to emit light toward the cultivation floor;
an irradiation light control unit configured to drive lighting of the light irradiation unit based on the plant cultivation method according to any one of (1) to (8); and
a cultivation room which is constructed to cover the cultivation floor.

Advantageous Effects of Invention

The present invention can provide a plant cultivation method and plant cultivation apparatus that are less prone to cause physiological disorders in leaves and withering of plants after harvest and can reduce the psychological load on workers and running cost and can accelerate the growth of plants.

DESCRIPTION OF EMBODIMENTS

Embodiment of the present invention are hereinafter described in detail.
(Plant Cultivation Method)
In a plant cultivation method in the present invention, a growth period in which an amount of carbon dioxide absorbed by photosynthesis is larger than an amount of carbon dioxide emitted by respiration and a rest period in which an amount of carbon dioxide emitted by respiration is larger than an amount of carbon dioxide absorbed by photosynthesis is alternately provided, and a plant is grown. At the time when switching is made between the growth period and the rest period, the amount of carbon dioxide absorbed (or oxygen emitted) by photosynthesis of the plant is equal to the amount of carbon dioxide emitted (or oxygen absorbed) by respiration of the plant. This point is called a "light compensation point."

In the growth period, the plant is irradiated with continuous irradiation light.

In the rest period, a dark period in which an intensity of light applied to the cultivation target plant is lower than the light intensity at the light compensation point and a bright period in which blue light whose wavelength is 400 nm or greater and 500 nm or shorter is applied at an intensity that is lower than the light intensity at the light compensation point are provided alternately. With this measure, the efficiency of photosynthesis light used by the plant is increased, whereby a sufficient growth acceleration effect is obtained.

The term "dark period" as used above means a period in which the plant is not irradiated with any light or the plant is irradiated with light excluding blue light whose wavelength is 400 nm or greater and 500 nm or shorter at an intensity that is lower than the light intensity at the light compensation point. Periods with no irradiation with light are necessary for the plant for, for example, repairing of cells, and thus, it is preferable not to irradiate the plant with any light in this period.

Figure 2:
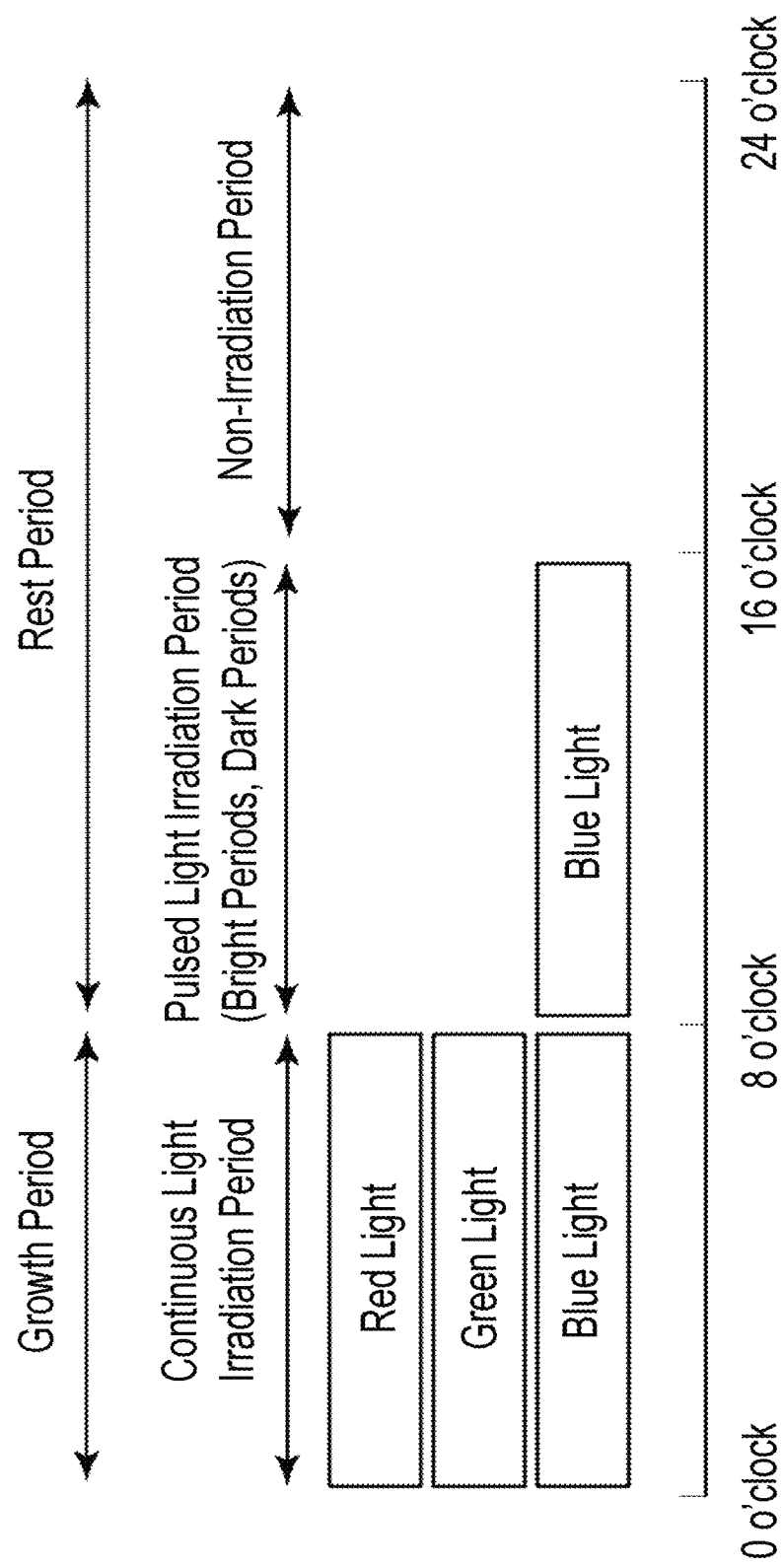
FIG. 2 is an example of a timing chart of light irradiation.

In other words, in the rest period, a pulsed light irradiation period in which the plant is irradiated with blue pulsed light and a non-irradiation period in which the plant is not irradiated at all are provided (see FIG. 2). The term "blue pulsed light" as used herein means light that is emitted from a blue light source and has a non-irradiation period and light irradiation period. That is, in the pulsed light irradiation period, a bright period in which the emission of blue light is on and a dark period in which the emission of blue light is off are provided alternately. With this measure, the efficiency of photosynthesis light used by the plant is increased, whereby a sufficient growth acceleration effect is obtained.

In the bright period, the cultivation target plant is irradiated with blue light whose wavelength is 400 nm or greater and 500 nm or shorter at an intensity that is lower than the light intensity at the light compensation point.

In the plant cultivation method in the present invention, a one-cycle time T of repetition of the dark period and the bright period is 2 μs or longer and 500 μs or shorter, and the duty ratio ΔT/T of the bright period ΔT (i.e., the pulse width of a single pulse) to the one-cycle time T is 20% or smaller.

Furthermore, a photosynthetic photon flux density (hereinafter also referred to as "PPFD") of blue pulsed light for irradiation in the bright period is 0.001 $\mu mol \cdot m^{-2} \cdot s^{-1}$ or higher and 4.0 $\mu mol \cdot m^{-2} \cdot s^{-1}$ or lower.
(Growth Period and Rest Period of Plant)

Figure 1:
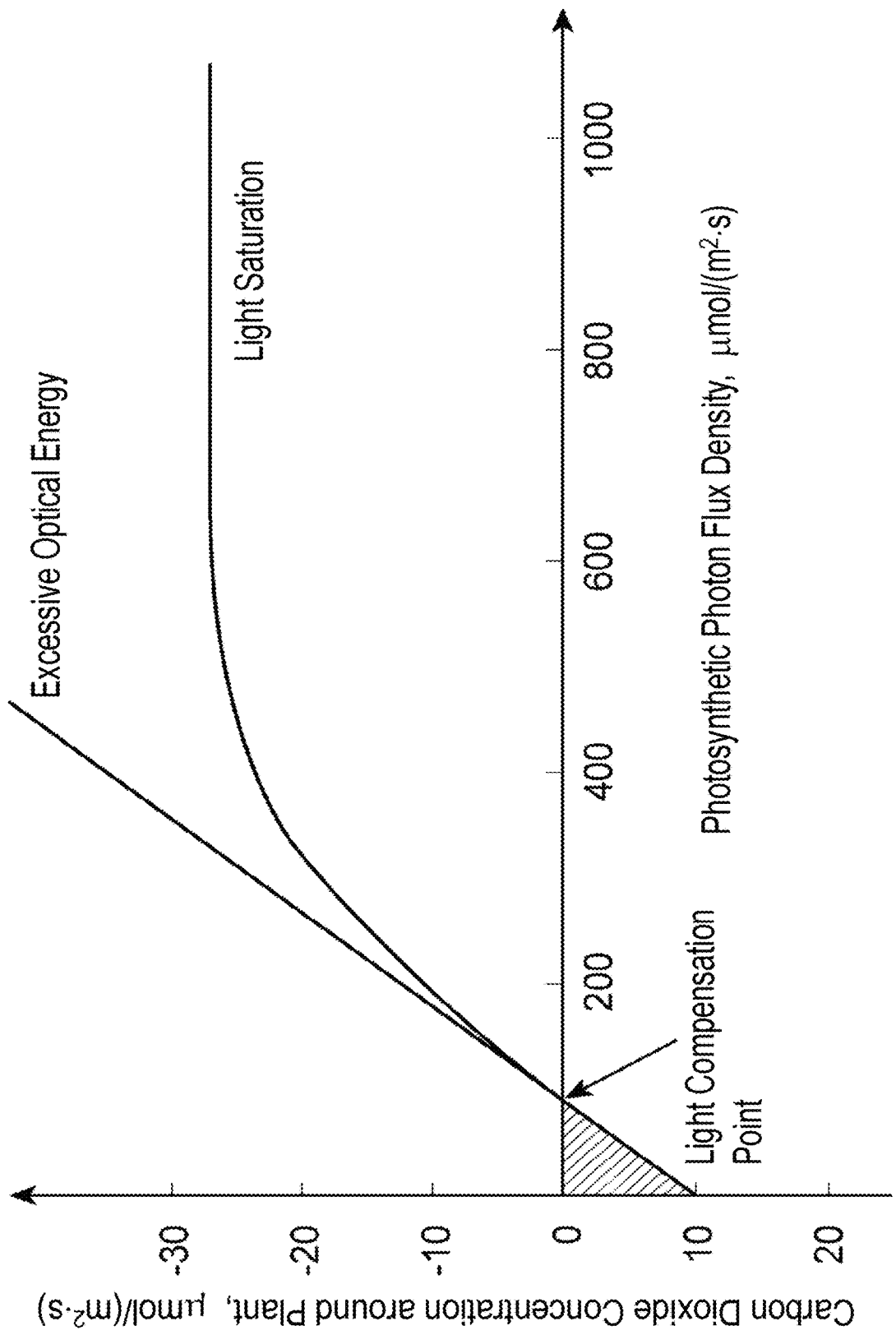
FIG. 1 is a graph showing an example of light-photosynthesis curve of a case of irradiation with continuous irradiation light.

FIG. 1 shows an example of light-photosynthesis curve of a case where a plant is irradiated with light continuously. The horizontal axis of the example graph shown represents the photosynthetic photon flux density (PPFD) and the vertical axis represents the carbon dioxide concentration around the plant that is determined by the difference between the amount of carbon dioxide absorbed by photosynthesis of the plant and the amount of carbon dioxide emitted by respiration of the plant. The carbon dioxide concentration around the plant correlates with the photosynthesis rate. As the photosynthesis rate becomes higher, the carbon dioxide absorption rate increases and hence the carbon dioxide concentration decreases.

As seen from the light-photosynthesis curve, the photosynthesis is saturated when the light intensity reaches at least a certain light intensity. The light intensity at which the photosynthesis is saturated is called a "light saturation intensity." Below the light saturation intensity, the photosynthesis becomes more active and the carbon dioxide concentration around the plant decreases as the light intensity increases. In this state, the photosynthesis is dominant over the respiration, that is, the amount of carbon dioxide absorbed by the photosynthesis is larger than the amount of carbon dioxide emitted by the respiration. This period is a growth period for the plant.

Conversely, as the light intensity decreases, the photosynthesis becomes less active and the carbon dioxide concentration around the plant increases. In this state, the respiration is dominant over the photosynthesis, that is, the amount of carbon dioxide emitted by the respiration is larger than the amount of carbon dioxide absorbed by the photosynthesis. This period is a rest period for the plant.

The plant performs photosynthesis and respiration simultaneously during the daytime and performs only respiration during the nighttime that is absent from light.

The range in which the PPFD of irradiation light is lower than that of the light compensation point corresponds to the rest period of the plant, and the range in which the PPFD of irradiation light is higher than that of the light compensation point corresponds to the growth period of the plant. The light compensation point varies depending on the kind of plants.

(Light Irradiation for Cultivation Target Plant)

In the plant cultivation method in the present invention, in the rest period, in the case where the plant is not irradiated with sunlight or continuous irradiation light from LED light sources, a fluorescent lamp or the like or the PPFD of such irradiation light is equal to or lower than that of the light compensation point, the plant is irradiated with particular blue pulsed light, whereby the growth speed of the plant is increased.

Blue light is effective in increasing the thickness and width of leaves, and it is also effective in preventing spindly growth. Since red light included much in morning sunlight has a function of finishing sleep of plants, pulsed light containing only blue light (i.e., not containing red light) has a function of maintaining a night environment for the plant. When blue pulsed light is compared with red pulsed light, irradiation with only blue pulsed light has a larger effect of growing plants. Thus, in the rest period, it is preferable to positively avoid irradiation with red light. However, unavoidable leakage of red light is allowable depending on its strength.

As one example, plant growing effects in the case of the PPFD being equal to 1.0 $\mu mol \cdot m^{-2} \cdot s^{-1}$ are compared between the case of irradiation with continuous irradiation light and the case of irradiation with pulsed light. In irradiation with continuous irradiation light during the daytime, the PPFD is at least 10 $\mu mol \cdot m^{-2} \cdot s^{-1}$. However, in the case of pulsed light irradiation, at a PPFD that is at the same level as during the daytime, a light intensity is too large and it may cause an influence that is harmful to growth of the plant. In view of this, the PPFD of pulsed light is set equal to 1/10 of the above lowest PPFD, that is, 1.0 $\mu mol \cdot m^{-2} \cdot s^{-1}$.

It is common that the light absorption by the photosynthesis of plants completes within about 1 fs. However, it is difficult to irradiate the whole of a plant uniformly with such an extremely short pulsed light. Thus, taking the case of light irradiation with pulsed light having a pulse width $\Delta T$ of 1.0 $\mu s$, a pulse interval T of 20 $\mu s$, and a duty ratio $\Delta T/T$ of 5% as an example, the effects of light irradiation are described below.

The light absorption by the photosynthesis of the plant completes within the pulse width $\Delta T$. Thus, the degree of photosynthesis of the plant irradiated with each of continuous irradiation light and pulsed light is proportional to the number of photons applied during the pulse width $\Delta T$. An effect of pulsed light shining on a light irradiation area of 1 $m^2$ is determined below.

In the case of irradiation with light having a PPFD of 1.0 $\mu mol \cdot m^{-2} \cdot s^{-1}$, a pulse width $\Delta T$ of 1.0 $\mu s$, and a duty ratio $\Delta T/T$ of 5%, the number of photons applied during an irradiation time of 20 $\mu s$ is equal to $1.2 \times 10^{13}$ in each of the cases of continuous irradiation light and pulsed light. When the irradiation time (pulse width $\Delta T$) of pulsed light is restricted to 1 $\mu s$, since the duty ratio $\Delta T/T$ is 5%, photons in the case of the pulsed light are applied at a density that is 20 times higher than the case of continuous irradiation light.

In the photosynthesis of plants, a transition time from light absorption of the photochemical system II (P680) to light absorption of the photochemical system I (P700) is about 200 $\mu s$. It is therefore considered that the light utilization efficiency of photosynthesis would become large when the irradiation interval of blue pulsed light is about 200 $\mu s$. Setting the pulse interval T at 20 $\mu s$ allows light absorption of the photochemical system I to occur without fail.

(Advantages of Irradiation with Blue Pulsed Light)

It is considered that irradiation with blue pulsed light in the rest period gives the following advantages.

(1) The photosynthesis rate of plants is proportional to the number of photons applied. In the case of the irradiation with pulsed light, 20 times more photons can be applied to a plant in a shorter time than the case of continuous irradiation light. As a result, the photosynthesis rate of the plant is made 20 times higher and its growth speed is increased. Irradiating a plant with pulsed light makes it possible to not only increase the photosynthesis rate of the plant but also maintain a night environment.

(2) Even in a case of irradiating a plant with blue pulsed light during the nighttime that is absent from light, the same environment as during the nighttime can be maintained for the plant by setting the duty ratio of the blue pulsed light small. With this measure, the glycolysis and sugar translocation that occur in the plant during the nighttime can be prevented from being affected to a large extent.

(3) Since a plant is irradiated with blue pulsed light during the nighttime that is absent from light, photosynthesis is performed by the blue light during the nighttime when the plant does not synthesize sugar ordinarily, whereby the plant is supplemented with sugar. This accelerates the growth of the plant because sugar is not exhausted for the plant. In addition, the following advantages are also expected: translocation of sugar that has been accumulated by irradiation with continuous irradiation light during the daytime is accelerated; photosynthesis occurring when irradiation with continuous irradiation light is started at the time of transition from nighttime to daytime is accelerated; and chlorophyll a which is indispensable for photosynthesis is increased.

FIG. 2 is an example of timing chart of light irradiation.

In the growth period, a plant is irradiated with sunlight or light (continuous irradiation light) emitted from an artificial light source such as LED light sources or a fluorescent lamp continuously for a prescribed time. This example shows an irradiation pattern for an indoor cultivation floor; in FIG. 2, one day is divided into three 8-hour periods. That is, time values shown in the figure do not indicate actual times and are values for merely defining individual periods. As shown in the figure, continuous irradiation light from red, green, and blue LED light are applied in the period from 0 o'clock to 8 o'clock (growth period). The PPFD of continuous irradiation light of each color is higher than that of the light compensation point.

After completion of the growth period in which the plant is irradiated with continuous irradiation light, a transition is made to a rest period. As described above, a pulsed light irradiation period in which blue pulsed light is applied and a non-irradiation period are provided in the rest period. A prescribed interval may be either provided or not provided between the end of irradiation with continuous irradiation light in the growth period and the start of irradiation with blue pulsed light in the rest period.

Although the pulsed light irradiation period of the rest period is from 8 o'clock to 16 o'clock and the non-irradiation period is from 16 o'clock to 24 o'clock, the present invention is not limited to this case and each period can be elongated or shortened.

In the case where the plant is a leafy vegetable, it is desirable that blue pulsed light applied in the bright period have a wavelength of 400 nm or greater and 500 nm or shorter and a peak wavelength of about 450 nm. The pulse width of blue pulsed light should be as short as possible so that it can be synchronized with light absorption timing (occurring every 200 to 500 µs, for example) of photosynthesis of the plants efficiently, whereby the growth of the plant is accelerated easily.

The one-cycle time T of repetition of the bright period and the dark period of blue pulsed light to be applied in the rest period is 2 µs or longer and 500 µs or shorter. It is preferable that the lower limit of the period T be 6.6 µs. Setting the period T in this range can enhance the plant growth acceleration effect.

The duty ratio $\Delta T/T$ of the bright period $\Delta T$ to the one-cycle time T of repetition of the bright period and dark period of blue pulsed light is 20% or smaller. Setting the duty ratio $\Delta T/T$ in this range can increase the plant growth speed.

The PPFD of blue pulsed light is 0.001 $\mu mol \cdot m^{-2} \cdot s^{-1}$ or higher and 4.0 $\mu mol \cdot m^{-2} \cdot s^{-1}$ or lower. It is preferable that the upper limit of the PPFD of blue pulsed light be 1 $\mu mol \cdot m^{-2} \cdot s^{-1}$. If the PPFD of blue pulsed light is higher than the upper limit of this range, the plant growth acceleration effect is diminished and, in some cases, no contribution to the plant growth is obtained (e.g., leaves wither).

(Plant Cultivation Apparatus)

Figure 3:
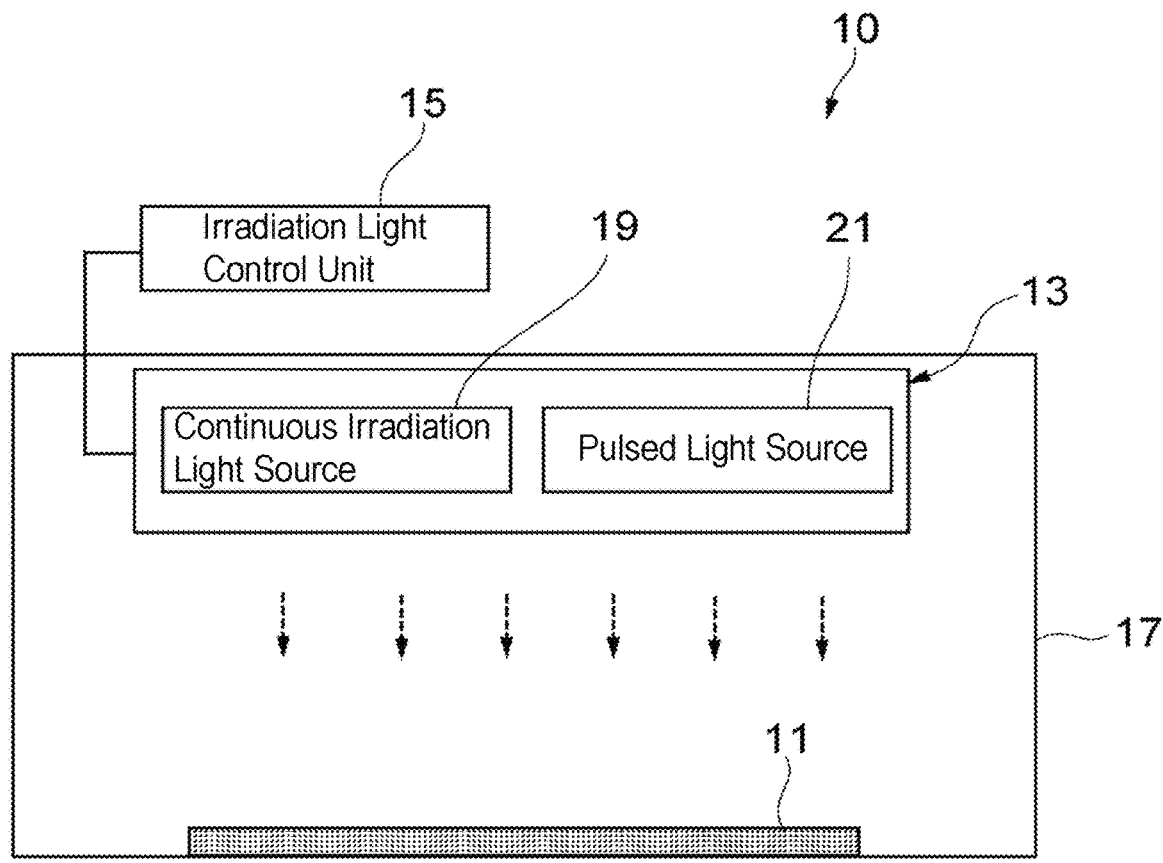
FIG. 3 is a diagram outlining the configuration of a plant cultivation apparatus.

FIG. 3 is a diagram outlining the configuration of a plant cultivation apparatus.

The plant cultivation apparatus 10 in the present invention includes a cultivation floor 11 for a hydroponic or soil cultivation, a light irradiation unit 13 configured to emit light toward the cultivation floor 11, and an irradiation light control unit 15 configured to drive lighting of the light irradiation unit 13. The plant cultivation apparatus 10 may also include a protective member 17 that covers the cultivation floor 11 to form a cultivation room.

The light irradiation unit 13 includes a continuous irradiation light source 19 which lights continuously in a prescribed time and a pulsed light source 21 from which pulsed light is emitted. An artificial light source such as LEDs, fluorescent lamps, plasma lamps, mercury lamps, incandescent bulbs, metal halide lamps, sodium lamps, or electrodeless lamps may be used as the continuous irradiation light source 19.

In the case where sunlight is used as continuous irradiation light, the light irradiation unit 13 does not include a continuous irradiation light source 19 which lights continuously in a prescribed time or does not light the continuous irradiation light source 19 even if the light irradiation unit 13 includes the continuous irradiation light source 19.

Light sources that can emit blue light and can be subjected to control of lighting of pulsed light easily, such as LEDs, ELs, or lasers, are employed as the pulsed light source 21. The pulsed light source 21 may have a configuration in which shutters are provided in the middle of optical paths of light sources that emit light continuously and pulsed light is formed by the shutters. In addition, the pulsed light source 21 may have a configuration in which wavelength limiting filters are attached to white light sources so as to produce blue light.

For example, the light irradiation unit 13 is installed on the ceiling surface of the protective member 17, on top portions of the side surfaces of the protective member 17, on top portions of poles installed in the cultivation floor 11 and irradiates the cultivation floor 11 in response to an instruction from the irradiation light control unit 15. It is preferable that the light irradiation unit 13 include plural light sources that are installed at different positions so as to have different irradiation angles. This makes it possible to irradiate the cultivation floor 11 with light uniformly and prevent occurrence of spatial unevenness of growth.

The irradiation light control unit 15 drives lighting of the light irradiation unit 13 based on the above-described plant cultivation method. In the case where the light irradiation unit 13 includes plural light sources, it is preferable that the irradiation light control unit 15 lights the plural light sources synchronously. In the case where the cultivation floor 11 is partitioned into plural blocks and control is performed on a block-by-block basis, the light sources may be either lit in units of a block or lit synchronously all together. Causing the light sources to operate synchronously makes it possible to correctly control the duty ratio of pulsed light applied to a plant.

The plant cultivation apparatus 10 can be applied suitably to various cultivation facilities such as a small cultivation kit that may be used readily by an ordinary family and large facilities such as an agricultural greenhouse and a plant cultivation factory having a constructed cultivation room.

Next, a description is made of a configuration example of an agricultural greenhouse to which the plant cultivation apparatus 10 in the present invention is applied.

The agricultural greenhouse may be an agricultural vinyl greenhouse in which a film(s) through which light is transmitted (described below) is stretched so as to cover the entire greenhouse or an agricultural glass house in which a film(s) extends so as to cover the entire inside surfaces of glass windows. In the case of an agricultural glass house, air existing in the cultivation space inside the house and containing water permeates the film and goes out of the house through gaps between the glass windows and their frame portions. Thus, also in the agricultural glass house, the inside space can be prevented from being rendered in a high-temperature, high-humidity state. The term "film through which light is transmitted" as used above means that the film allows passage of light that is necessary to grow plants during the daytime.

The above-described film that is used for greenhouse cultivation in an agricultural greenhouse or the like (hereinafter also referred to as an "agricultural film") contains at least one selected from the group consisting of fluororesins, polyethylene, polypropylene, polyester, polyvinyl chloride, polyamide, and polycarbonate.

Examples of the fluororesin include polyvinylidene fluoride, polytetrafluoroethylene, polychlorotrifluoroethylene, polyhexafluoropropylene, polyvinyl fluoride, a vinylidene fluoride-tetrafluoroethylene-hexafluoropropylene-based copolymer, a vinylidene fluoride-hexafluoropropylene-based copolymer, an ethylene-tetrafluoroethylene-based copolymer (ETFE), a tetrafluoroethylene-hexafluoropropylene-based copolymer, and a perfluoro(alkylvinyl ether)-tetrafluoroethylene-based copolymer. Either one kind of fluororesin or two or more kinds of fluororesins may be used.

From the viewpoints of cost, low-temperature shaping performance, and an ability to form a strong film, it is preferable to use, as the fluororesin, EFTE, a tetrafluoroethylene-hexafluoropropylene-based copolymer, or a perfluoro(alkylvinyl ether)-tetrafluoroethylene-based copolymer, and EFTE is particularly preferable.

From the viewpoint of weatherability, it is preferable that the agricultural film further contain an ultraviolet absorber. The ultraviolet absorber may be a common one and may be, for example, an inorganic ultraviolet absorber such as cerium oxide, zinc oxide, or iron oxide or an organic ultraviolet absorber on the market. Either one kind of ultraviolet absorber or two or more kinds of ultraviolet absorbers may be used.

In the case where the agricultural film contains an ultraviolet absorber, the agricultural film should preferably contain the ultraviolet absorber in an amount of 0.4 to 5 mass %, particularly preferably 0.5 to 3 mass %, based on the agricultural film (100 mass %). In the case where the content of the ultraviolet absorber is equal to or higher than the lower limit of the above range, the agricultural film exhibits high weatherability. In the case where the content of the ultraviolet absorber is equal to or lower than the upper limit of the above range, the haze does not become too large and hence sufficient light can be taken into the agricultural greenhouse.

The agricultural film may be a film having irregularities in one surface. It is preferable that the agricultural film be installed so that its surface having irregularities (also referred to as a "concave-convex surface") faces the inside of the agricultural greenhouse.

The thickness of the agricultural film should preferably be in a range of 25 to 500 μm, particularly preferably be in a range of 50 to 250 μm. In the case where the thickness of the agricultural film is equal to or larger than the lower limit of the above range, sufficient strength can be obtained easily. In the case where the thickness of the agricultural film is equal to or smaller than the upper limit of the above range, the agricultural film is high in transparency and superior in handling for installation.

The surface, facing the inside of the house, of the agricultural film may be coated with an anti-dripping agent. There are no particular limitations on the anti-dripping agent and common one may be used. For example, the anti-dripping agent may be inorganic fine particles such as silica fine particles and alumina fine particles.

To enhance the coating performance of the anti-dripping agent, the surface, facing the inside of the house, of the agricultural film may be subjected to surface treatment. There are no particular limitations on the surface treatment. Examples of the surface treatment include plasma treatment, ozone treatment, flame treatment, chemical conversion treatment, and primer treatment. For example, primer treatment may be performed after plasma treatment. Examples of the plasma treatment include coating with a silane coupling agent.

EXAMPLES

The present invention is described in detail using Examples. However, the present invention is not limited by the following description. The relationships between irradiation conditions in each of Test Example 1 to Test Example 10 and Examples/Comparative Examples are as follows.

|  | [Examples] | [Comparative Examples] |
| --- | --- | --- |
| Test Example 1: | 4A, 6A | 1A to 3A, 5A |
| Test Example 2: | 1B to 5B | 6B |
| Test Example 3: | 1C, 2C | 3C |
| Test Example 4: | 1D to 5D | 6D |
| Test Example 5: | 2E | 1E |
| Test Example 6: | 1F, 3F | 2F, 4F |
| Test Example 7: | 2G to 4G | 1G |
| Test Example 8: | 2H, 3H | 1H |
| Test Example 9 | 2I | 1I |
| Test Example 10 | 2J | 1J |

The description of each Test Example includes whether the following irradiation light setting conditions are satisfied.

Setting condition 1: Growth period exists.
Setting condition 2: Rest period exists.
Setting condition 3: Growth period and rest period are provided alternately.
Setting condition 4: Only continuous irradiation light is applied during growth period.
Setting condition 5: Dark period is provided in rest period.
Setting condition 6: Bright period is provided in rest period.
Setting condition 7: The one-cycle time of irradiation with blue pulsed light during rest period is 2 μs or longer and 500 μs or shorter.
Setting condition 8: The duty ratio of irradiation with blue pulsed light during rest period is 20% or smaller.
Setting condition 9: The PPFD of blue light is 0.001 $\mu mol \cdot m^{-2} \cdot s^{-1}$ or higher and 4.0 $\mu mol \cdot m^{-2} \cdot s^{-1}$ or lower.

Test Example 1

Lettuces were cultivated by hydroponics. The degree of growth of lettuce leaves were measured in each of the case where the lettuces were irradiated with LED blue light and LED red light as continuous irradiation light and the case where the lettuces were irradiated additionally with LED blue pulsed light as pulsed light. The degree of growth of leaves was evaluated by measuring a total mass ratio of leaves and an area ratio of leaves by the methods described later. As for the cultivation environment, the temperature was 22° C., the humidity was 40% to 50%, and supplement of carbon dioxide was not made. As for a liquid fertilizer, Hyponex (registered trademark; liquid fertilizer produced by Hyponex Japan Corp., Ltd.) was used with 1,000-fold dilution.

Figure 4:
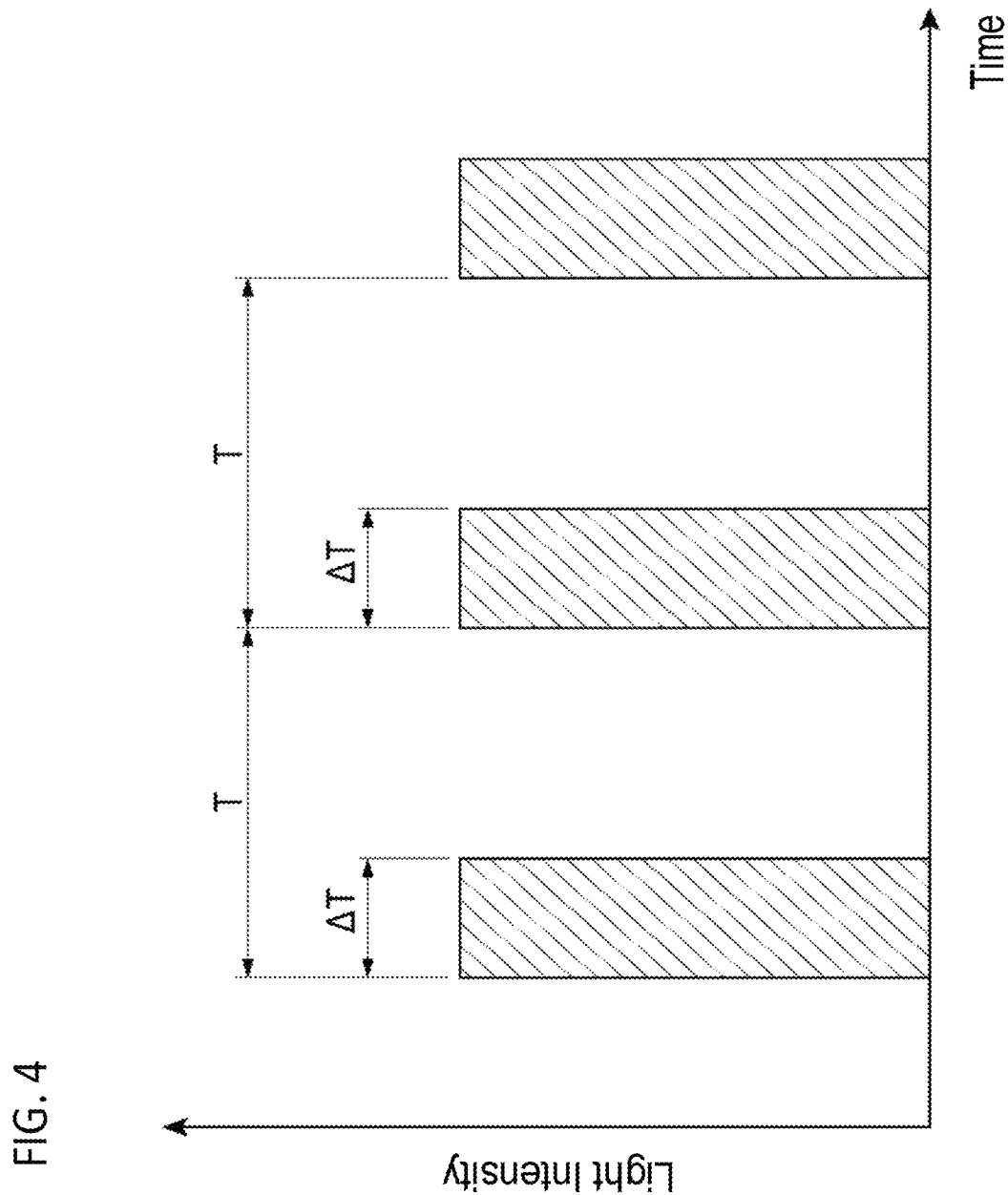
FIG. 4 is a diagram illustrating a temporal variation of the intensity of blue pulsed light.

FIG. 4 shows a temporal variation of the intensity of blue pulsed light. In the pulsed light irradiation period during which the plants were irradiated with blue pulsed light, the period during which blue light was applied is referred to as a bright period (pulse width: ΔT) and the period during which no blue light was applied is referred to as a dark period (see FIG. 2). In this Test Example, the lettuces were irradiated repeatedly with blue light in such a manner that ΔT was set at 2 μs and the one-cycle time T (total of ΔT and a dark period) was set at 20 μs.

Table 1 shows irradiation conditions relating to the continuous irradiation light source and the pulsed light source and lettuce growth results.

A leaf area and a total mass of the case of the irradiation condition 1A were employed as the reference leaf area and the reference total mass.

In the irradiation conditions 1A to 6A, continuous irradiation light was applied for 12 hours (from 6 o'clock to 18 o'clock). In the irradiation condition 1A, the PPFDs of red continuous irradiation light and blue continuous irradiation

TABLE 1

Test Example 1

| | Continuous irradiation light | | | Pulsed light | | | | Growth results | |
|---|---|---|---|---|---|---|---|---|---|
| Irradiation condition | PPFD of red light ($\mu mol \cdot m^{-2} \cdot s^{-1}$) | PPFD of blue light ($\mu mol \cdot m^{-2} \cdot s^{-1}$) | Irradiation time slot | PPFD of blue light ($\mu mol \cdot m^{-2} \cdot s^{-1}$) | Pulse cycle time T (μs) | Duty ratio (%) | Irradiation time slot | Leaf area ratio | Total mass ratio |
| 1A | 48 | 8.3 | 6 to 18 o'clock | 0 | — | — | No irradiation | 1 | 1 |
| 2A | 48 | 0 | 6 to 18 o'clock | 0.1 | 20 | 10 | 6 to 18 o'clock | 1.02 | 1.1 |
| 3A | 48 | 1.5 | 6 to 18 o'clock | 0.1 | 20 | 10 | 6 to 18 o'clock | 0.7 | 0.67 |
| 4A | 48 | 1.5 | 6 to 18 o'clock | 0.1 | 20 | 10 | 18 o'clock to 2 o'clock next day | 1.24 | 1.5 |
| 5A | 48 | 1.5 | 6 to 18 o'clock | 0 | — | — | No irradiation | 0.82 | 0.88 |
| 6A | 48 | 8.3 | 6 to 18 o'clock | 0.1 | 20 | 10 | 24 hours | 0.9 | 0.92 |

The irradiation light control unit controlled the light intensities of blue light and red light emitted from the LED light sources independently of each other. The peak wavelengths of blue light and red light were 450 nm and 660 nm, respectively. Since PPFDs at which the lettuces were grown most were (red, blue)=(48, 8) (unit: $\|mol \cdot m^{-2} \cdot s^{-1}$), the other irradiation conditions (irradiation conditions 2A to 6A) were determined based on this irradiation condition employed as a reference (irradiation condition 1A).

That is, the PPFD of red light was fixed and the PPFD of blue light was set at plural strength values. The PPFD of red light was measured in a wavelength range of 600 to 700 nm and the PPFD of blue light was measured in a wavelength range of 400 to 500 nm. The peak wavelength of blue light was 450 nm.

First, lettuces were replanted for hydroponics 7 days after they were seeded. A leaf area and a total mass were measured 42 days after the seeding. A leaf area was estimated on the basis of an area of an outermost leaf and a mass of the whole of one head of lettuce.

Figure 5:
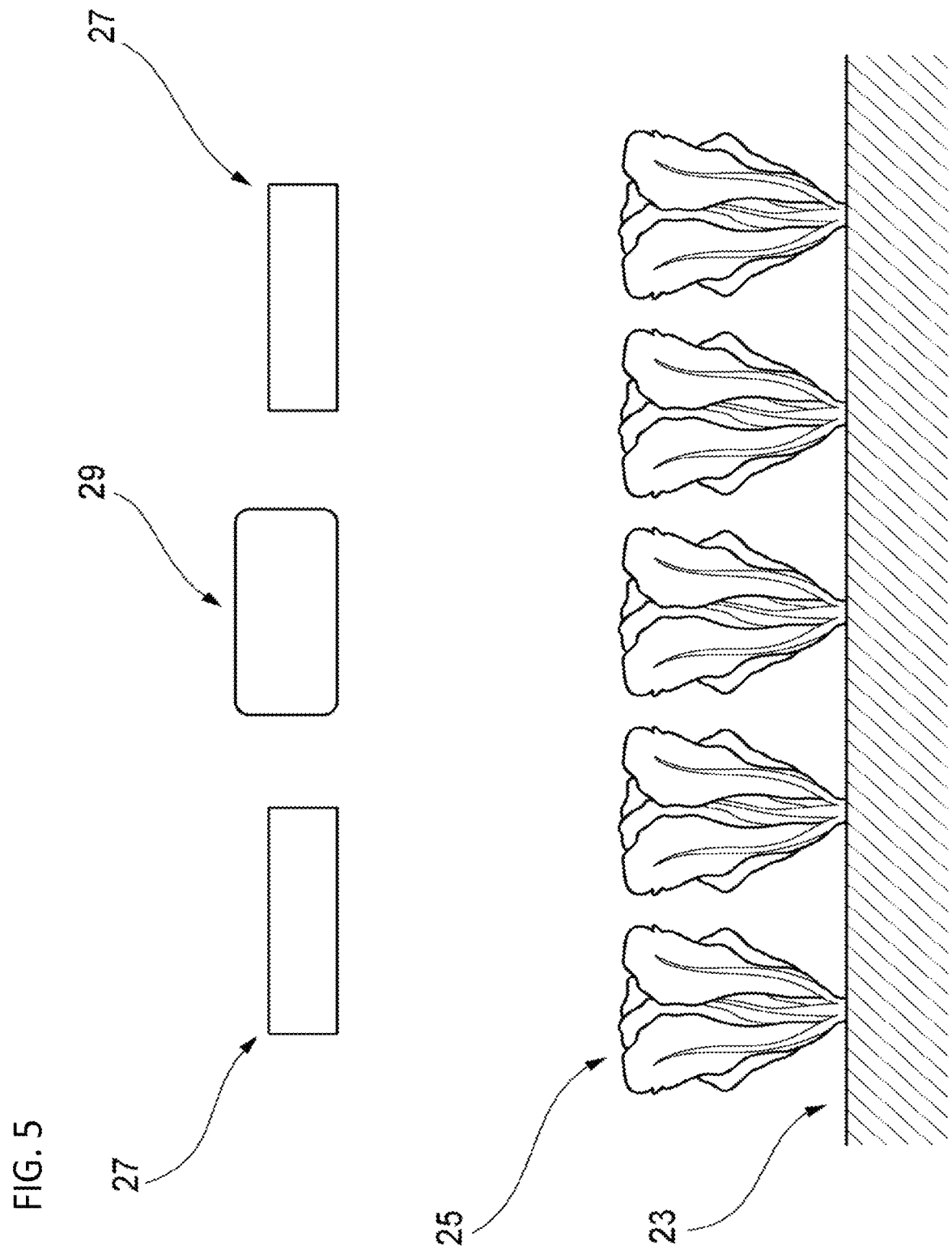
FIG. 5 is a diagram illustrating an arrangement of a light irradiation unit and lettuces in a cultivation floor in Test Example 1.

FIG. 5 shows an arrangement of a light irradiation unit and lettuces in Test Example 1. Lettuces 25 were arranged at prescribed intervals in a hydroponic tank 23 as a cultivation floor. Continuous irradiation light sources 27 capable of emitting red light and blue light and a pulsed light source 29 for emitting blue pulsed light were arranged alternately above the lettuces 25. Each of the continuous irradiation light sources 27 and the pulsed light source 29 employed an LED light source.

The lighting of the continuous irradiation light sources 27 and the pulsed light source 29 were driven independently of each other in response to instructions from the irradiation light control unit (not shown).

A leaf area and a total mass of the cultivation target plants (lettuces) were measured and a reference area value (reference leaf area) and a reference total mass were set. A "leaf area ratio" and a "total mass ratio" in the table were calculated in accordance with Equations (1) and (2), respectively:

(Leaf area ratio)=(measured value of area)/(reference area value)   (1)

(Total mass ratio)=(measured total mass)/(reference total mass)   (2)

light were 48 $\mu mol \cdot m^{-2} \cdot s^{-1}$ and 8.3 $\mu mol \cdot m^{-2} \cdot s^{-1}$, respectively, and no blue pulsed light was applied.

In the irradiation condition 2A, red continuous irradiation light and blue pulsed light (PPFD: 0.1 $\mu mol \cdot m^{-2} \cdot s^{-1}$) were applied from 6 o'clock to 18 o'clock. As for lettuce growth results of this case, approximately the same leaf area ratio and total mass ratio as in the case of the irradiation condition 1A were obtained. This shows that blue pulsed light that is 1/8.3 of blue continuous irradiation light in light intensity provides the same growth effect as the blue continuous irradiation light.

In the irradiation condition 3A, blue pulsed light was applied simultaneously with red continuous irradiation light and blue continuous irradiation light. In this case, a leaf area ratio was 0.70 and a total mass ratio was 0.67. These results show that simultaneous irradiation with continuous irradiation light and blue pulsed light prevents the growth of lettuces.

In the irradiation condition 4A, blue pulsed light was applied for 8 hours after irradiation with continuous irradiation light. In this case, a leaf area ratio was 1.24 and a total mass ratio was 1.50. The growth of lettuces was accelerated most when blue pulsed light whose PPFD was 0.1 $\mu mol \cdot m^{-2} \cdot s^{-1}$ was applied during a time slot without irradiation with continuous irradiation light.

The test under the irradiation condition 5A was different from that under the irradiation condition 4A in that blue pulsed light was not applied. As a result, a leaf area ratio was 0.82 and a total mass ratio was 0.88. It is concluded from comparison between the cases of the irradiation conditions 3A, 4A, and 5A that irradiation with blue pulsed light during a period outside the period of irradiation with continuous irradiation light is effective for the growth of lettuces.

The test under the irradiation condition 6A was different from that under the irradiation condition 1A in that blue pulsed light was applied for 24 hours in addition to the irradiation with continuous irradiation light. As a result, both of the leaf area ratio and the total mass ratio were smaller by about 10% than in the case of the irradiation condition 1A. This shows that the simultaneous irradiation with continuous irradiation light and blue pulsed light in the growth period prevents the growth of lettuces. On the other hand, the irradiation with blue pulsed light during the time slot in the rest period without irradiation with continuous irradiation light has an effect of accelerating the growth of lettuces. It can be inferred that growth of the same level as in the case of the irradiation condition 1A was obtained through mutual cancellation between the two effects.

Figure 6:
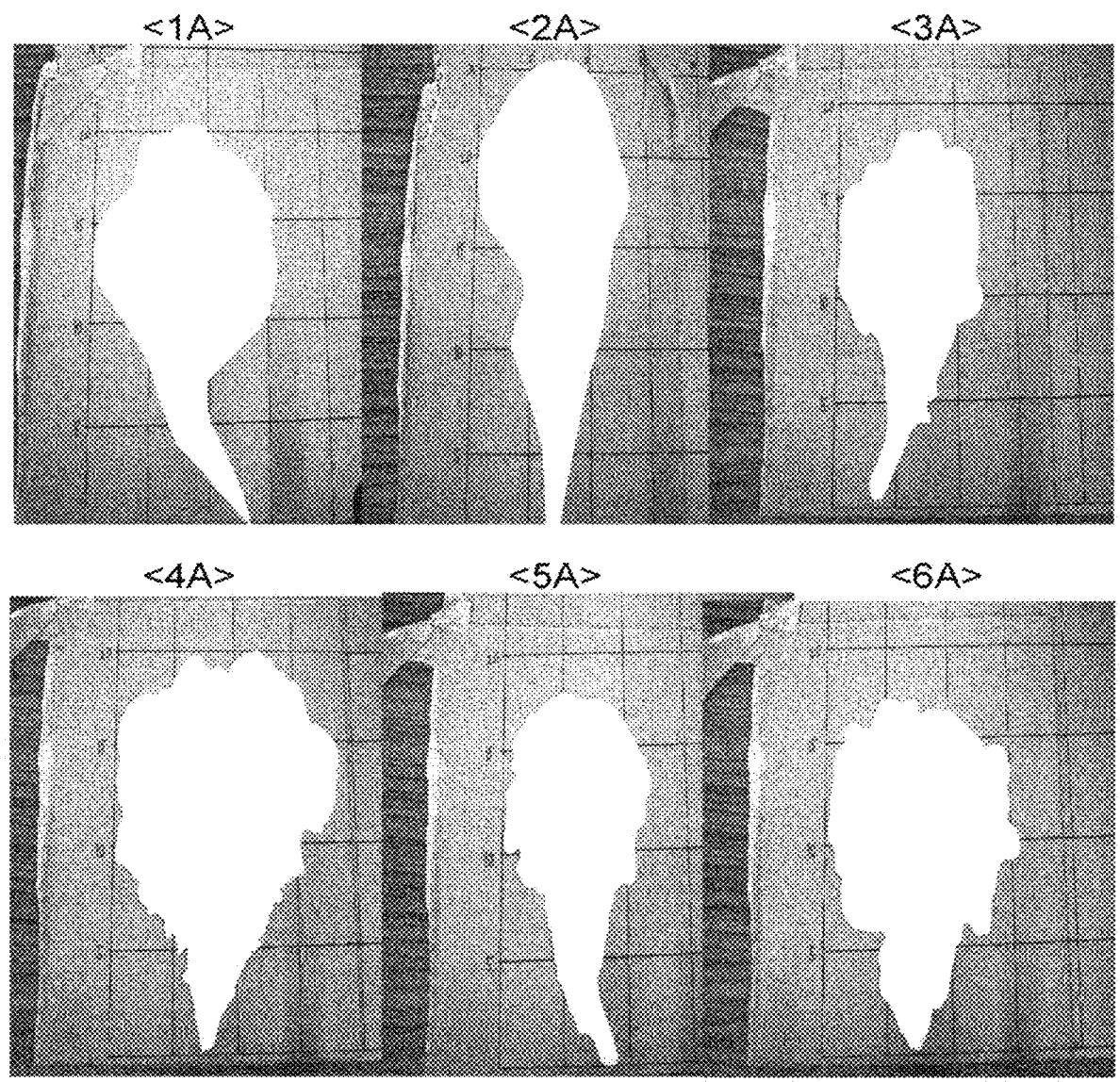
FIG. 6 is photographs of lettuce leaves produced under respective irradiation conditions.

FIG. 6 is photographs of lettuce leaves produced with light irradiation under the irradiation conditions 1A to 6A. In these photographs, the lettuce leaves appear white.

As compared with the reference case of the irradiation condition 1A, it is found that the leaf in the case of the irradiation condition 4A is larger in both of length and width.

In the cases concerned, the individual irradiation light setting conditions are satisfied or not satisfied as follows.
Irradiation condition 1A: Only the setting conditions 1 to 4 are satisfied.
Irradiation condition 2A: Only the setting conditions 1 to 3 are satisfied.
Irradiation condition 3A: Only the setting conditions 1 to 3 are satisfied.
Irradiation condition 4A: All of the setting conditions 1 to 9 are satisfied.
Irradiation condition 5A: Only the setting conditions 1 to 3 are satisfied.
Irradiation condition 6A: Only the setting condition 4 is not satisfied.

Test Example 2

Next, lettuces were cultivated in such a manner that continuous irradiation light and blue pulsed light were applied at the same intensities during the same irradiation time slot as under the irradiation condition in Table 1 and the duty ratio of blue pulsed light was changed in a range of 2% to 30%. Lettuce growth results in these cases are shown in Table 2.

TABLE 2

Test Example 2

| Irradiation condition | Continuous irradiation light | | | Pulsed light | | | | Growth results |
| | PPFD of red light ($\mu mol \cdot m^{-2} \cdot s^{-1}$) | PPFD of blue light ($\mu mol \cdot m^{-2} \cdot s^{-1}$) | Irradiation time slot | PPFD of blue light ($\mu mol \cdot m^{-2} \cdot s^{-1}$) | Pulse cycle time T ($\mu s$) | Duty ratio (%) | Irradiation time slot | Total mass ratio |
|---|---|---|---|---|---|---|---|---|
| 1B | 48 | 1.5 | 6 to 18 o'clock | 0.1 | 20 | 2 | 18 o'clock to 2 o'clock next day | 1 |
| 2B | 48 | 1.5 | 6 to 18 o'clock | 0.1 | 20 | 5 | 18 o'clock to 2 o'clock next day | 1.0 ± 0.1 |
| 3B | 48 | 1.5 | 6 to 18 o'clock | 0.1 | 20 | 10 | 18 o'clock to 2 o'clock next day | 1.0 ± 0.1 |
| 4B | 48 | 1.5 | 6 to 18 o'clock | 0.1 | 20 | 15 | 18 o'clock to 2 o'clock next day | 1.0 ± 0.1 |
| 5B | 48 | 1.5 | 6 to 18 o'clock | 0.1 | 20 | 20 | 18 o'clock to 2 o'clock next day | 1.0 ± 0.1 |
| 6B | 48 | 1.5 | 6 to 18 o'clock | 0.1 | 20 | 30 | 18 o'clock to 2 o'clock next day | 0.7 ± 0.1 |

As seen from the growth results shown in Table 2, whereas the degree of growth remained the same as long as the duty ratio of blue pulsed light was in a range of 2% to 20%, the total mass ratio of leaves was very small when the duty ratio of blue pulsed light was 30%. This shows that the duty ratio of blue pulsed light in the range of 2% to 20% is suitable for lettuce growth.

In the cases concerned, the individual irradiation light setting conditions are satisfied or not satisfied as follows.
Irradiation conditions 1B to 5B: All of the setting conditions 1 to 9 are satisfied.
Irradiation condition 6B: Only the setting condition 8 is not satisfied.

Test Example 3

Next, lettuces were cultivated in such a manner that continuous irradiation light and pulsed light (blue, red) were applied at the same intensities during the same irradiation time slots as under the irradiation condition 4A in Table 1, the duty ratio of pulsed light was fixed at 10%, and the proportion between blue pulsed light and red pulsed light was changed. Lettuce growth results in these cases are shown in Table 3.

TABLE 3

Test Example 3

| Irradiation condition | Continuous irradiation light | | | Pulsed light | | | | | Growth results |
| | PPFD of red light ($\mu mol \cdot m^{-2} \cdot s^{-1}$) | PPFD of blue light ($\mu mol \cdot m^{-2} \cdot s^{-1}$) | Irradiation time slot | PPFD of blue light ($\mu mol \cdot m^{-2} \cdot s^{-1}$) | PPFD of red light ($\mu mol \cdot m^{-2} \cdot s^{-1}$) | Pulse cycle time T ($\mu s$) | Duty ratio (%) | Irradiation time slot | Total mass ratio |
|---|---|---|---|---|---|---|---|---|---|
| 1C | 48 | 1.5 | 6 to 18 o'clock | 0.1 | 0 | 20 | 10 | 18 o'clock to 2 o'clock next day | 1 |

TABLE 3-continued

| | Test Example 3 | | | | | | | | |
|---|---|---|---|---|---|---|---|---|---|
| Irradi- | Continuous irradiation light | | | Pulsed light | | | | | Growth results |
| ation condition | PPFD of red light ($\mu$mol·m$^{-2}$·s$^{-1}$) | PPFD of blue light ($\mu$mol·m$^{-2}$·s$^{-1}$) | Irradiation time slot | PPFD of blue light ($\mu$mol·m$^{-2}$·s$^{-1}$) | PPFD of red light ($\mu$mol·m$^{-2}$·s$^{-1}$) | Pulse cycle time T ($\mu$s) | Duty ratio (%) | Irradiation time slot | Total mass ratio |
| 2C | 48 | 1.5 | 6 to 18 o'clock | 0.05 | 0.05 | 20 | 10 | 18 o'clock to 2 o'clock next day | 0.9 ± 0.1 |
| 3C | 48 | 1.5 | 6 to 18 o'clock | 0 | 0.1 | 20 | 10 | 18 o'clock to 2 o'clock next day | 0.8 ± 0.1 |

As seen from the growth results shown in Table 3, the addition of red pulsed light decreased the total mass by about 10% to 20%. This shows that irradiation with only blue pulsed light provides a larger growth effect. Since the leaf total mass decreased by 10% when the PPFD of blue pulsed light was 0.05 $\mu$mol·m$^{-2}$·s$^{-1}$, it was found that the lower limit of the PPFD of blue pulsed light should preferably be 0.1 $\mu$mol·m$^{-2}$·s$^{-1}$.

In the cases concerned, the individual irradiation light setting conditions are satisfied or not satisfied as follows.
Irradiation conditions 1C and 2C: All of the setting conditions 1 to 9 are satisfied.
Irradiation condition 3C: Only the setting conditions 6 and 9 are not satisfied.

Test Example 4

Next, lettuces were cultivated in such a manner that continuous irradiation light and blue pulsed light were applied at the same intensities during the same irradiation time slots as under the irradiation condition 4A in Table 1, the duty ratio of blue pulsed light was fixed at 10%, and the intensity of blue pulsed light was changed. Lettuce growth results in these cases are shown in Table 4.

condition 1A in the cases of the irradiation conditions 5D and 4 in which the PPFD of blue pulsed light was 4.0 $\mu$mol·m$^{-2}$·s$^{-1}$ and 1.0 $\mu$mol·m$^{-2}$·s$^{-1}$, respectively. These results show that, in order to grow lettuces satisfactorily, the PPFD of blue pulsed light is 4.0 $\mu$mol·m$^{-2}$·s$^{-1}$ or lower and should preferably be 1.0 $\mu$mol·m$^{-2}$·s$^{-1}$ or lower.

The result of the case of the irradiation condition 2D in which the PPFD of blue pulsed light was 0.001 $\mu$mol·m$^{-2}$·s$^{-1}$ was also equivalent to the results of the cases of irradiation conditions 3D to 5D.

In the cases concerned, the individual irradiation light setting conditions are satisfied or not satisfied as follows.
Irradiation conditions 1D to 5D: All of the setting conditions 1 to 9 are satisfied.
Irradiation condition 6D: Only the setting condition 6 and 9 are not satisfied.

Test Example 5

Next, hydroponic cultivation of lettuces were carried out under two irradiation conditions, that is, only continuous irradiation (8 hours) by fluorescent lamps and continuous irradiation (8 hours) by fluorescent lamps plus irradiation with blue pulsed light (6 hours).

TABLE 4

| | Test Example 4 | | | | | | | | |
|---|---|---|---|---|---|---|---|---|---|
| Irradi- | Continuous irradiation light | | | Pulsed light | | | | | Growth results |
| ation condition | PPFD of red light ($\mu$mol·m$^{-2}$·s$^{-1}$) | PPFD of blue light ($\mu$mol·m$^{-2}$·s$^{-1}$) | Irradiation time slot | PPFD of blue light ($\mu$mol·m$^{-2}$·s$^{-1}$) | Pulse cycle time T ($\mu$s) | Duty ratio (%) | Irradiation time slot | | Total mass ratio |
| 1D | 48 | 1.5 | 6 to 18 o'clock | 0.1 | 20 | 10 | 18 o'clock to 2 o'clock next day | | 1 |
| 2D | 48 | 1.5 | 6 to 18 o'clock | 0.001 | 20 | 10 | 18 o'clock to 2 o'clock next day | | 1.0 ± 0.1 |
| 3D | 48 | 1.5 | 6 to 18 o'clock | 0.05 | 20 | 10 | 18 o'clock to 2 o'clock next day | | 1.0 ± 0.1 |
| 4D | 48 | 1.5 | 6 to 18 o'clock | 1 | 20 | 10 | 18 o'clock to 2 o'clock next day | | 1.0 ± 0.1 |
| 5D | 48 | 1.5 | 6 to 18 o'clock | 4 | 20 | 10 | 18 o'clock to 2 o'clock next day | | 1.0 ± 0.1 |
| 6D | 48 | 1.5 | 6 to 18 o'clock | 5 | 20 | 10 | 18 o'clock to 2 o'clock next day | | <0.2 |

As seen from the growth results shown in Table 4, the lettuce growth decreased remarkably in the case of the irradiation condition 6D in which the PPFD of blue pulsed light was 5.0 $\mu$mol·m$^{-2}$·s$^{-1}$ or higher. And the lettuce growth was equivalent to that of the case of the reference irradiation Irradiation conditions of continuous irradiation light by the fluorescent lamps and irradiation conditions of blue pulsed light and lettuce cultivation results are shown in Table 5.

TABLE 5

Test Example 5

| Irradiation condition | Continuous irradiation light | | | | Pulsed light | | | | Growth results | |
|---|---|---|---|---|---|---|---|---|---|---|
| | PPFD of red light ($\mu mol \cdot m^{-2} \cdot s^{-1}$) | PPFD of green light ($\mu mol \cdot m^{-2} \cdot s^{-1}$) | PPFD of blue light ($\mu mol \cdot m^{-2} \cdot s^{-1}$) | Irradiation time slot | PPFD of blue light ($\mu mol \cdot m^{-2} \cdot s^{-1}$) | Pulse cycle time T ($\mu s$) | Duty ratio (%) | Irradiation time slot | Leaf area ratio | Total mass ratio |
| 1E | 41 | 96 | 62 | 6 to 14 o'clock | 0 | — | — | No irradiation | 1 | 1 |
| 2E | 41 | 96 | 62 | 6 to 14 o'clock | 0.05 | 20 | 10 | 14 to 20 o'clock | 1.60 | 1.75 |

The pulse width $\Delta T$ of bright periods and the one-cycle time T of blue pulsed light used for the hydroponics was 2 $\mu s$ and 20 $\mu s$, respectively. The PPFD of red light of the fluorescent lamp was measured in a wavelength range of 600 to 700 nm, the PPFD of green light of the fluorescent lamp was measured in a wavelength range of 500 to 600 nm, and the PPFD of blue light of the fluorescent lamp was measured in a wavelength range of 400 to 500 nm.

As for the cultivation environment, the temperature was 22° C., the humidity was 40% to 50%, and supplement of carbon dioxide was not made. As for a liquid fertilizer, 4 mL of Hyponex (registered trademark; liquid fertilizer produced by Hyponex Japan Corp., Ltd.) was used with 1,000-fold dilution.

Lettuces were replanted for hydroponics 7 days after they were seeded. A leaf area and a mass were measured 42 days after the seeding. A leaf area of an outermost leave was measured.

A leaf area ratio and a total mass ratio of the case of the irradiation condition 2E were determined with respect to those (reference growth) of the case of the irradiation condition 1E. Blue pulsed light was applied after 8-hour irradiation with light from the fluorescent lamps, whereby the leaf area and the total mass were increased by 1.60 times and 1.75 times, respectively.

This test example shows that the leaf area and the total mass are increased by 1.60 times and 1.75 times, respectively, by applying blue pulsed light whose PPFD is 0.05 $\mu mol \cdot m^{-2} \cdot s^{-1}$ for 6 hours per day in the rest period.

In the cases concerned, the individual irradiation light setting conditions are satisfied or not satisfied as follows.
Irradiation condition 1E: Only the setting conditions 1 to 4 are satisfied.
Irradiation condition 2E: All of the setting conditions 1 to 9 are satisfied.

Test Example 6

Next, a lettuce cultivation test was carried out in a vinyl greenhouse that was located at 43.0° north latitude and 141.3° east longitude. Seedlings were planted on October 1st and lettuces were harvested on November 18th. The lettuces were cultivated in a reference section in which only sunlight was applied and a test section in which sunlight and blue pulsed light were applied. One hundred seedlings were planted in each of the reference section and the test section. The sunrise time and the sunset time of the day of planting of the seedlings were 29 minutes past 5 o'clock and 21 minutes past 17 o'clock, respectively. The sunrise time and the sunset time of the day of harvest were 29 minutes past 6 o'clock and 29 minutes past 16 o'clock, respectively. The PPFD of sunlight in the cultivation period was 850 $\mu mol \cdot m^{-2} \cdot s^{-1}$ at noon and 40 $\mu mol \cdot m^{-2} \cdot s^{-1}$ at sunset, for example.

Sunlight was applied from sunrise to sunset in the reference section and the test section. In the test section, blue pulsed light was applied for 8 hours from sunset. The PPFD and the duty ratio of blue pulsed light were 0.1 $\mu mol \cdot m^{-2} \cdot s^{-1}$ and 20%, respectively. In the test section, light sources were arranged so that the lettuces were irradiated with blue pulsed light at least from four directions.

The average of total mass values of portions excluding roots of lettuces harvested was 180 g in the reference section (irradiation condition 1F) and 252 g in the test section (irradiation condition 2F). As such, the amount of lettuce harvested increased by 1.4 times in terms of total mass by applying blue pulsed light for 8 hours after sunset.

A test similar to the above test was carried out from December 15th to February 20th. The PPFD of sunlight in the cultivation period was 600 $\mu mol \cdot m^{-2} \cdot s^{-1}$ at noon and 20 $\mu mol \cdot m^{-2} \cdot s^{-1}$ at sunset, for example. The average of total mass values of portions excluding roots of lettuces harvested was 130 g in the reference section (irradiation condition 3F) and 230 g in the test section (irradiation condition 4F). As such, the amount of lettuce harvested increased by 1.7 times in terms of total mass by applying blue pulsed light.

As described above, in the cases of outdoor cultivation, vinyl greenhouse cultivation, etc., remarkable growth effects were found particularly in a season when the sunshine hours are short. A similar test in which the duty ratio of the blue pulsed light sources was set at 50% was carried out and a total mass of lettuces harvested had no meaningful difference from a value obtained in the reference section.

In the cases concerned, the individual irradiation light setting conditions are satisfied or not satisfied as follows.
Irradiation conditions 1F to 3F: All of the setting conditions 1 to 9 are satisfied.

Next, the cases where the plant cultivation method according to the present invention was applied to species other than lettuce are described. Species involved and their growth results are shown in Table 6.

TABLE 6

Test Examples 7 to 10

| | Species | Growth result |
|---|---|---|
| Test Example 7 | Basil | ○ |
| Test Example 8 | *Monostroma nitidum* | ○ |
| Test Example 9 | *Euglena* | ○ |
| Test Example 10 | Strawberry | ○ |

Test Example 7

The influence of irradiation with blue pulsed light on the growth of basil in greenhouse cultivation utilizing only sunlight was studied. Irradiation conditions are shown in Table 7. The PPFDs in the greenhouse varied depending on the month/day and the time, and one example was as follows: (PPFD of red light, PPFD of green light, PPFD of blue light)=(417, 387, 280) (unit: $\mu mol \cdot m^{-2} \cdot s^{-1}$). The center wavelength of blue pulsed light was 450 nm. The distance between the pulsed light source and basil was about 1 m. Blue pulsed light was applied for 6 hours after sunset. The number of days of irradiation was 20. A basil growth amount was evaluated in terms of total mass.

A total mass of Monostroma nitidum was measured every five days. In the graph, the mark "○" indicates an input total mass of Monostroma nitidum on the first cultivation day, the mark "□" indicates growth results in the reference water tank with irradiation with only sunlight (irradiation condition 1H), and the mark "■" indicates growth results in the test water tank with irradiation with sunlight and irradiation with blue pulsed light during the nighttime (irradiation condition 2H).

TABLE 7

Test Example 7

| Irradiation condition | Continuous irradiation light | | | | Pulsed light | | | | Growth results |
|---|---|---|---|---|---|---|---|---|---|
| | PPFD of red light ($\mu mol \cdot m^{-2} \cdot s^{-1}$) | PPFD of green light ($\mu mol \cdot m^{-2} \cdot s^{-1}$) | PPFD of blue light ($\mu mol \cdot m^{-2} \cdot s^{-1}$) | Irradiation time slot | PPFD of blue light ($\mu mol \cdot m^{-2} \cdot s^{-1}$) | Pulse cycle time T ($\mu s$) | Duty ratio (%) | Irradiation time slot | Total mass ratio |
| 1G | 417 | 387 | 280 | 6 to 18 o'clock | 0 | — | — | 6 hours after sunset | 1 |
| 2G | 417 | 387 | 280 | 6 to 18 o'clock | 0.05 | 6.6 | 15 | 6 hours after sunset | 1.3 |
| 3G | 417 | 387 | 280 | 6 to 18 o'clock | 0.05 | 50 | 2 | 6 hours after sunset | 1.8 |
| 4G | 417 | 387 | 280 | 6 to 18 o'clock | 0.05 | 500 | 0.2 | 6 hours after sunset | 1.4 |

Total mass ratios of the cases with irradiation with blue pulsed light (irradiation conditions 2G to 4G) was 1.8 times larger than the total mass ratio of the case without irradiation with blue pulsed light (irradiation condition 1G).

In the cases concerned, the individual irradiation light setting conditions are satisfied or not satisfied as follows.
Irradiation condition 1G: Only the setting conditions 1 to 4 are satisfied.
Irradiation condition 2G to 4G: All of the setting conditions 1 to 9 are satisfied.

Test Example 8

The influence of irradiation with blue pulsed light during the nighttime (rest period) on the growth of Monostroma nitidum that had grown to thalli was studied. Deep-sea water at about 15° C. was pumped up into a water tank having a capacity 1,000 L with a pump and a water depth of 40 cm was maintained by a free-flowing method. To quantify the effect of irradiation with blue pulsed light in the dark period, a reference water tank for irradiation with only sunlight during the daytime and a test water tank for irradiation with sunlight during the daytime and irradiation with blue pulsed light after sunset were prepared.

Monostroma nitidum of 50 g (total mass) in thallus form was put in each water tank. Convection of Monostroma nitidum was caused in each water tank by injecting air (aeration). A pulsed light source was installed over the test water tank so that 80% of the water surface was irradiated with light.

The pulsed light source was a blue light source whose emission peak wavelength was 449 nm. The duty ratio and the PPFD at the water surface of pulsed light in the dark period were 3% and 0.02 $\mu mol \cdot m^{-2} \cdot s^{-1}$, respectively. Blue pulsed light was applied during the nighttime, that is, for 6 hours after sunset.

Figure 7:
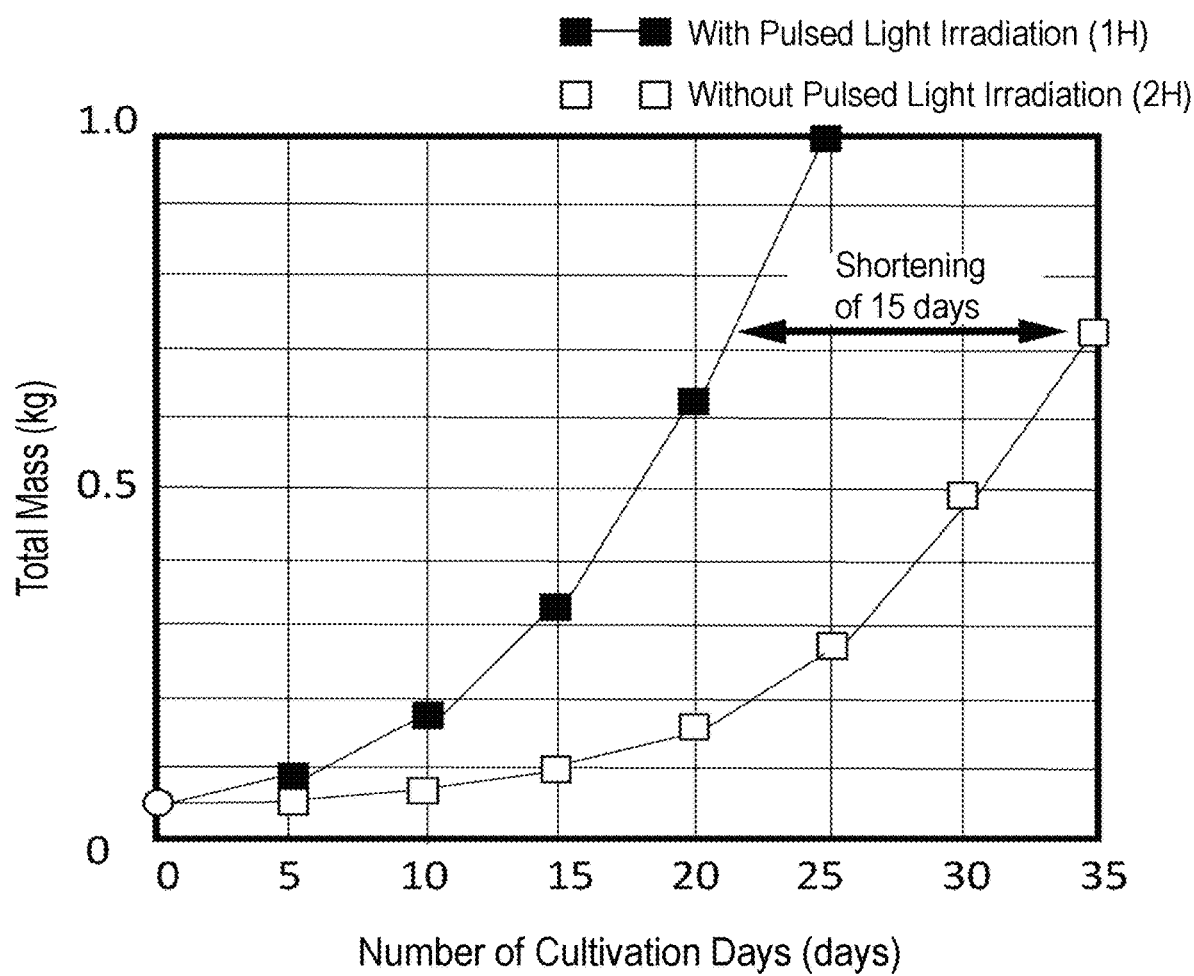
FIG. 7 is a graph of test results showing growth of Monostroma nitidum in the form of the total mass vs. the number of cultivation days.

FIG. 7 is a graph of the test result showing the growth of Monostroma nitidum in the form of the total mass vs. the number of cultivation days.

Mass increase by the pulsed light irradiation was observed on the fifth cultivation day in the dark period. The total mass on the 25th day with irradiation with pulsed light (irradiation condition 2H) was 3.5 times larger than that with irradiation with only sunlight (irradiation condition 1H). A total mass that was obtained by cultivation for 35 days with irradiation with only sunlight (irradiation condition 1H) was attained 15 days earlier in the case with irradiation with pulsed light (irradiation condition 2H). The test was carried out under the same conditions as in the above test example except that the duty ratio was set at 0.1% (irradiation condition 3H), and then, approximately the same growth acceleration effect as shown in FIG. 7 was obtained.

In the cases concerned, the individual irradiation light setting conditions are satisfied or not satisfied as follows.
Irradiation condition 1H: Only the setting conditions 1 to 4 are satisfied.
Irradiation condition 2H and 3H: All of the setting conditions 1 to 9 are satisfied.

Test Example 9

The influence of the irradiation with blue pulsed light in the rest period on the growth of Euglena was studied.

Euglena was put in a flask filled with an aqueous solution (1,000-fold dilution) of Hyponex (registered trademark) and was stirred with an aeration pump. The water temperature was kept at 21° C. The initial concentration of Euglena was 5 µg/L. Two flasks were prepared for the growth test and the same amount of Euglena was put in each flask. One flask was irradiated with only light emitted from a fluorescent lamp (irradiation condition 1I), and the other flask was irradiated with blue pulsed light in the rest period after the irradiation with light emitted from the fluorescent lamp (irradiation condition 2I). The irradiation with light emitted from the fluorescent lamp was performed for 12 hours from 9 o'clock to 21 o'clock, and the irradiation with blue pulsed light was performed for 6 hours from 21 o'clock to 3 o'clock. The PPFD of light emitted from the fluorescent lamp was 210 μmol·m$^{-2}$·s$^{-1}$. The PPFD and the duty ratio of blue pulsed light were 0.04 μmol·m$^{-2}$·s$^{-1}$ and 5%, respectively.

The blue pulsed light was blue light having a peak wavelength 443 nm. Whereas no difference in the growth state occurred between application and non-application of blue pulsed light for 4 or 5 days from the start of the test, a clear difference was observed from the seventh day.

Growth states of Euglena were compared with each other on the 10th day from the start of the test. In the flask of the case with the irradiation with blue pulsed light (irradiation condition 2I), more groups of Euglena multiplied by division were observed than in the flask of the case with the irradiation with only light emitted from the fluorescent lamp (irradiation condition 1I).

Chlorophyll a is a dye that is responsible for photosynthesis. A concentration (mass) variation of Euglena can be determined on the basis of a concentration of chlorophyll a.

Figure 8:
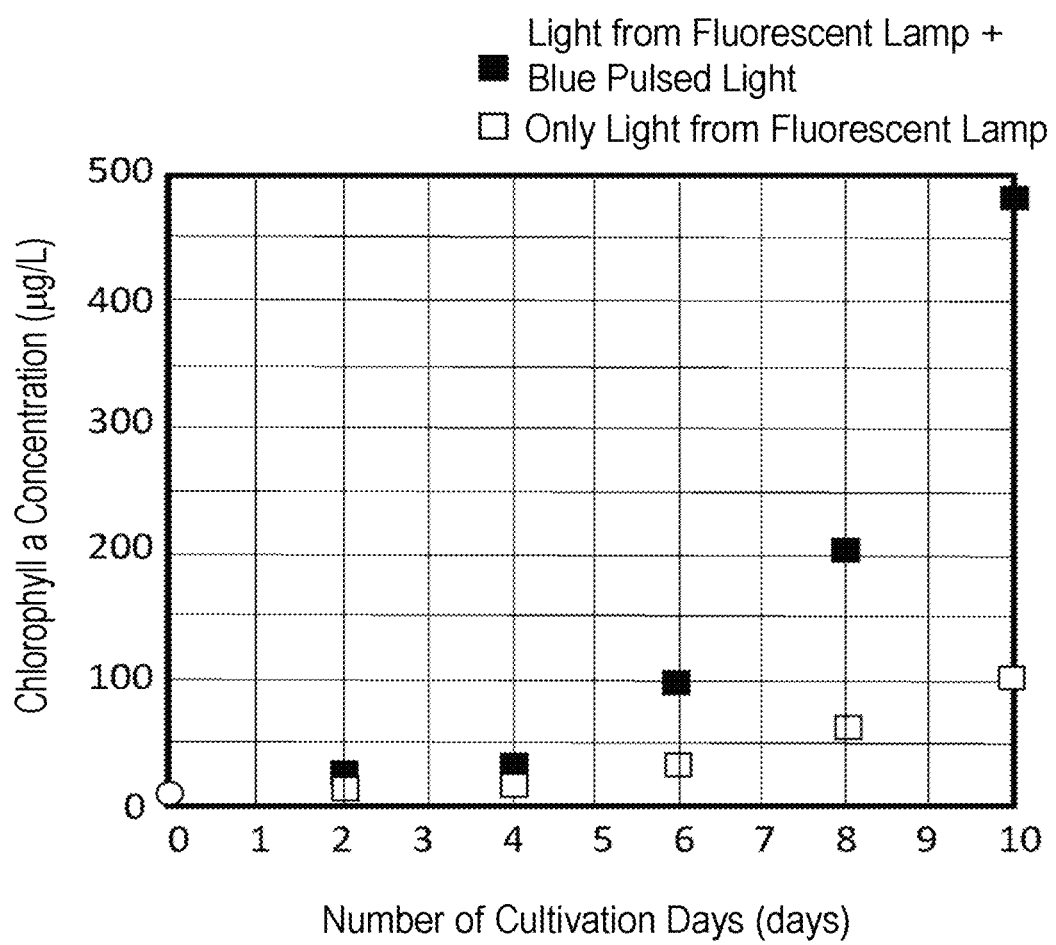
FIG. 8 is a graph of test results showing growth of Euglena in the form of the chlorophyll a concentration vs. the number of cultivation days.

FIG. 8 is a graph of the test results showing the growth of Euglena in the form of the chlorophyll a concentration vs. the number of cultivation days.

Chlorophyll a concentrations (μg/L) in each flask were measured at intervals of two days. A chlorophyll a concentration was measured using DS-5 produced by Environment System Co., Ltd. In the graph, the mark "□" indicates growth results with irradiation by only the fluorescent lamp (irradiation condition 1I), and the mark "■" indicates growth results with irradiation by the fluorescent lamp and irradiation with blue pulsed light (irradiation condition 2I). A remarkable difference in chlorophyll a concentration was found from the 6th cultivation day. On the 10th day, the chlorophyll a concentration was 480 μg/L in the case with the irradiation with blue pulsed light (irradiation condition 2I) and was 100 μg/L in the case with the irradiation by only the fluorescent lamp (irradiation condition 1I).

In the cases concerned, the individual irradiation light setting conditions are satisfied or not satisfied as follows.
Irradiation condition 1I: Only the setting conditions 1 to 4 are satisfied.
Irradiation condition 2I: All of the setting conditions 1 to 9 are satisfied.

Test Example 10

The influence of the irradiation with blue pulsed light during the nighttime on the sugar content of a strawberry was studied. The irradiation period of sunlight was from sunrise to sunset. Two strawberry plant pots were prepared, and they were irradiated with daytime sunlight under the same conditions and only one of them was irradiated with blue pulsed light for 6 hours after sunset. The emission peak wavelength, the duty ratio, and the PPFD on the surface of the topmost leaf of blue pulsed light were 443 nm, 5%, and 0.08 μmol·m$^{-2}$·s$^{-1}$, respectively.

Sugar contents of strawberries were measured 58 days after the start of the cultivation. Since the sugar content of a strawberry depends on its portion, a strawberry was divided into three equal parts perpendicularly to its longitudinal axis and sugar contents of the respective parts were measured with sugar content meter APAL-1 produced by As One Corporation.

As for measurement results, the sugar content of the reference strawberry plant that was irradiated with only daytime sunlight (irradiation condition 1J) was 9.0. On the other hand, the sugar content of the strawberry plant that was irradiated with daytime sunlight and also irradiated with blue pulsed light after sunset (irradiation condition 2J) was 11.7. Each of these sugar content values was a value of the part that was closest to the calyx. The test strawberries (irradiation condition 2J) showed sugar contents equal to or higher than the reference strawberries (irradiation condition 1J) in the other ones of the three divisional parts.

In the cases concerned, the individual irradiation light setting conditions are satisfied or not satisfied as follows.
Irradiation condition 1J: Only the setting conditions 1 to 4 are satisfied.
Irradiation condition 2J: All of the setting conditions 1 to 9 are satisfied.

INDUSTRIAL APPLICABILITY

The plant cultivation method in the present invention are effective for outdoor cultivation, greenhouse cultivation, and cultivation in plant cultivation factories. Being effective at accelerating the growth of every plant that performs photosynthesis, the plant cultivation method in the present invention can be used for increasing the efficiency and reducing the cost of production of leafy vegetables such as lettuce and basil, fruit plants such as a strawberry, grain plants such as a rice and wheat, sea vegetables such as brown seaweed, and green algae such as Monostroma nitidum and Euglena.

The present application is based on Japanese Patent Application No. 2017-153544 filed on Aug. 8, 2017, the contents of which are incorporated herein by reference.

REFERENCE SIGNS LIST

10: Plant cultivation apparatus
11: Cultivation floor
13: Light irradiation unit
15: Irradiation light control unit
17: Protective member
19, 27: Continuous irradiation light source
21, 29: Pulsed light source
23: Hydroponic tank
25: Lettuce
ΔT: Pulse width of bright period
T: Pulse cycle time (one-cycle time of repetition of dark period and bright period)

The invention claimed is:
1. A plant cultivation method, comprising:
providing a lighting schedule that results in providing, alternately, a growth period in which an amount of carbon dioxide absorbed by photosynthesis is larger than an amount of carbon dioxide emitted by respiration and a rest period in which an amount of carbon dioxide emitted by respiration is larger than an amount of carbon dioxide absorbed by photosynthesis; and
growing a plant,
wherein:
in the rest period, a dark period in which an intensity of light applied to the cultivation target plant is lower than a light intensity at a light compensation point and a bright period in which blue light whose wavelength is 400 nm or greater and 500 nm or shorter is applied at an intensity that is lower than the light intensity at the light compensation point are provided alternately, wherein in the dark period emission of the blue light is off and in the bright period the emission of the blue light is on;
a one-cycle time T of repetition of the dark period and the bright period is 2 μs or longer and 500 μs or shorter;
a duty ratio ΔT/T of a time ΔT of the bright period to the one-cycle time T is 20% or smaller; and the blue light has a photosynthetic photon flux density of 0.001 $\mu mol \cdot m^{-2} \cdot s^{-1}$ or higher and 4.0 $\mu mol \cdot m^{-2} \cdot s^{-1}$ or lower.

2. The plant cultivation method according to claim 1, wherein the photosynthetic photon flux density of the blue light is 0.001 $\mu mol \cdot m^{-2} \cdot s^{-1}$ to 1.0 $\mu mol \cdot m^{-2} \cdot s^{-1}$ or lower.

3. The plant cultivation method according to claim 1, wherein in the dark period, the plant is not irradiated with red light whose wavelength is 600 nm or greater and 700 nm or shorter.

4. The plant cultivation method according to claim 1, wherein the blue light is light emitted from an LED light source.

5. The plant cultivation method according to claim 1, wherein light that is applied to the plant in the growth period is sunlight or continuous irradiation light emitted from an artificial light source.

6. The plant cultivation method according to claim 5, wherein the artificial light source is an LED light source or a fluorescent lamp.

7. The plant cultivation method according to claim 1, further comprising:
providing a non-irradiation period in which the plant is not irradiated with light.

8. A plant cultivation apparatus comprising:
a light irradiation unit configured to irradiate a plant with light; and
an irradiation light control unit configured to drive lighting of the light irradiation unit based on the plant cultivation method according to claim 1.

9. The plant cultivation apparatus according to claim 8, further comprising a protective member through which light is transmitted and which covers a cultivation floor of the plant.

10. A plant cultivation apparatus comprising:
a cultivation floor in which a plant is planted;
a light irradiation unit configured to emit light toward the cultivation floor;
an irradiation light control unit configured to drive lighting of the light irradiation unit based on the plant cultivation method according to claim 1; and
a cultivation room which is constructed to cover the cultivation floor.

* * * * *